United States Patent
Carlson et al.

(10) Patent No.: US 6,930,196 B2
(45) Date of Patent: Aug. 16, 2005

(54) POLYURETHANE HYDROGEL CONTACT LENS

(75) Inventors: Gregory Carlson, Park Ridge, IL (US); Edgar Allan Blair, Flagstaff, AZ (US); Peter Wachtel, Scotch Plains, NJ (US); Michael Quinn, Valparaiso, IN (US); Joshua Wallach, Des Plaines, IL (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/892,345

(22) Filed: Jun. 26, 2001

(65) Prior Publication Data

US 2002/0032297 A1 Mar. 14, 2002

Related U.S. Application Data

(60) Provisional application No. 60/214,649, filed on Jun. 26, 2000.

(51) Int. Cl.$^7$ .............. C07C 271/10; C07C 271/24; C07C 271/26; C07D 251/34; C08G 18/48
(52) U.S. Cl. .............. 560/25; 252/182.22; 528/67; 528/73; 528/76; 528/85; 544/222; 560/26; 560/115; 560/158
(58) Field of Search .............. 252/182.22; 528/67, 528/73, 76, 85; 544/222; 560/25, 26, 115, 158

(56) References Cited

U.S. PATENT DOCUMENTS

| | | | |
|---|---|---|---|
| 3,719,050 A | 3/1973 | Asao et al. | 166/29.5 |
| 3,786,034 A | 1/1974 | Blair et al. | 527/302 |
| 3,821,136 A | 6/1974 | Hudgin et al. | 527/302 |
| 3,822,238 A | 7/1974 | Blair et al. | 528/59 |
| 3,939,105 A | 2/1976 | Jones, Jr. et al. | 521/63 |
| 3,939,123 A * | 2/1976 | Matthews et al. | 528/60 |
| 3,940,542 A * | 2/1976 | Knopf et al. | 428/364 |
| 4,118,354 A | 10/1978 | Harada et al. | 524/711 |
| 4,209,605 A * | 6/1980 | Hoy et al. | 528/54 |
| 4,255,550 A | 3/1981 | Gould | 528/44 |
| 4,259,467 A | 3/1981 | Keogh et al. | 526/279 |
| 4,359,558 A | 11/1982 | Gould et al. | 525/454 |
| 4,403,083 A | 9/1983 | Marans et al. | 528/44 |
| 4,408,023 A | 10/1983 | Gould et al. | 525/454 |
| 4,454,309 A | 6/1984 | Gould et al. | 525/454 |
| 4,490,423 A | 12/1984 | Gould et al. | 428/36 |
| 4,496,535 A | 1/1985 | Gould et al. | 424/19 |
| 4,644,033 A | 2/1987 | Gnanou et al. | 524/590 |
| 4,668,564 A | 5/1987 | Orchard | 428/246 |
| 4,687,816 A | 8/1987 | Lin et al. | 525/279 |
| 4,689,386 A | 8/1987 | Chapman et al. | 528/71 |
| 4,810,582 A | 3/1989 | Gould et al. | 428/423.1 |
| 4,886,866 A | 12/1989 | Braatz et al. | 528/59 |
| 5,039,458 A | 8/1991 | Braatz et al. | 264/2.6 |
| 5,149,052 A | 9/1992 | Stoy et al. | 249/105 |
| 5,354,835 A | 10/1994 | Blair | 528/59 |
| 5,508,317 A | 4/1996 | Müller | 522/85 |
| 5,674,942 A | 10/1997 | Hill et al. | 525/131 |
| 5,789,464 A | 8/1998 | Müller | 523/108 |
| 5,849,810 A | 12/1998 | Müller | 522/85 |
| 6,039,913 A | 3/2000 | Hirt et al. | 264/531.11 |

FOREIGN PATENT DOCUMENTS

| | | |
|---|---|---|
| EP | 0 189 484 A | 8/1986 |
| FR | 2 539 135 A | 7/1984 |
| JP | 11-255859 | 9/1999 |
| WO | WO 98/00205 A1 | 1/1998 |
| WO | WO 98/42497 A2 | 10/1998 |
| WO | WO 98/42497 A3 | 10/1998 |

OTHER PUBLICATIONS

L. Bromberg, J. Appl. Polym. Sci. 1996, 59, 459–466.

* cited by examiner

Primary Examiner—Rabon Sergent
(74) Attorney, Agent, or Firm—Jian Zhou; Robert J. Gorman; R. Scott Meece

(57) ABSTRACT

A prepolymer is prepared by reacting a mixture containing (a) at least one multifunctional compound, (b) at least one diisocyanate, and (c) at least one diol. The diol has a weight average molecular weight of at most 6000. The prepolymer, when reacted with an excess of water, forms a hydrogel polymer. The mixture of the prepolymer and water may be reaction molded, and used to form a contact lens.

25 Claims, No Drawings

POLYURETHANE HYDROGEL CONTACT LENS

This application claims the benefit of U.S. Provisional Application No. 60/214,649, filed Jun. 26, 2000, which is incorporated herein by reference.

BACKGROUND

The present invention relates to polyurethane contact lenses.

Contact lenses have been manufactured by a variety of methods, including lathing, and cast molding. Lathing is not able to meet the demands of cheap, high-volume, and fast production. Efforts to reduce the inherent cost disadvantages of lathing have produced a process that is a hybrid of lathing and cast molding. For example, lenses may be prepared by casting one side of the lens and lathing the other side. This process is cheaper than lathing, but not as cheap as a complete cast molding process.

Cast molding requires the use of two complementary molds. These molds are often disposable, and the cost to replace the mold for each new lens is a significant part of the total cost of the final lens. Furthermore, lenses made by cast molding also suffer a large number of quality defects during in situ polymerization, due to shrinkage. For example, shrinkage may cause surface voids and the non-adherence of the final product to the lens design. Others have attempted to eliminate shrinkage and thereby improve cast molding techniques.

In the contact lens industry, attempts have been made to use injection molding processes to make contact lenses from polymethylmethacrylate (PMMA). PMMA lenses are hard and not oxygen permeable, i.e., they do not compare to the quality of hydrogel lenses. Thus, while injection molded processes, such as typically used in the plastics industry, are capable of high-speed, high-volume, consistent-quality mass production, there have not been good contact lens materials that could take advantage of those plastics manufacturing processes.

A common type of contact lens is made from a hydrogel, typically a crosslinked hydroxyethyl methacrylate polymer or copolymer, containing 37–75% water. These lenses are soft gels, that have good oxygen transport properties, and are generally known as "soft lenses". These lenses are very comfortable for the wearer, but do not have ideal optical properties. Other lenses have been made from silicone rubber, also a soft lens material; or silicone or fluorine containing acrylate or methacrylate polymers, forming a rigid gas permeable (RPG) lens. These lenses have a hydrophobic surface, reducing comfort to the wearer, and may also be difficult to manufacture.

Polyurethane polymers and copolymers have also been used for contact lenses. Examples are described in U.S. Pat. Nos. 3,786,034; 4,255,550; 4,359,558; 4,454,309; 4,886,866; 5,039,458 and 5,674,942; as well as Japanese Patent publication 11255859; PCT international publication nos. WO 98/42497 and WO 98/00205. Some of these describe polyurethane hydrogels. In addition, polyurethane hydrogels are also described in U.S. Pat. Nos. 4,118,354; 4,644,033; 4,668,564; and 5,354,835.

There is a need for a polyurethane hydrogel for reaction molding contact lenses wherein reaction injection molding offers the greatest economic benefits. These lenses should be soft, have wettable surfaces, high oxygen transmission properties, and high physical strength. Furthermore, the lenses should be able to be sterilized by autoclaving or chemicals.

BRIEF SUMMARY

In a first aspect, the invention is a prepolymer, prepared by reacting a mixture containing (a) at least one multifunctional compound, (b) at least one diisocyanate, and (c) at least one diol. The diol has a weight average molecular weight of at most 7000. The prepolymer has a viscosity of at most 100,000 cps at 70° C., and when reacted with an excess of water, forms a hydrogel polymer.

In a second aspect, the invention is a prepolymer, prepared by reacting a mixture containing (a) at least one triisocyanate, (b) at least one diisocyanate, and (c) at least one polyalkylene oxide. The molar ratio of (a):(b):(c) in the mixture is 0.9–1.1:1.8–3.3:1.8–3.3. The at least one polyalkylene oxide has a weight average molecular weight of at most 7000, and, when reacted with an excess of water, forms a hydrogel polymer.

In a third aspect, the invention is a prepolymer, prepared by reacting a mixture containing (a) at least one triol, (b) at least one diisocyanate, and (c) at least one polyalkylene oxide. The molar ratio of (a):(b):(c) in said mixture is 0.9–1.1:1.8–2.2:4.5–5.5. The at least one polyalkylene oxide has a weight average molecular weight of at most 6000, and, when reacted with an excess of water, forms a hydrogel polymer.

In a fourth aspect, the invention is a prepolymer of formula I:

Formula I

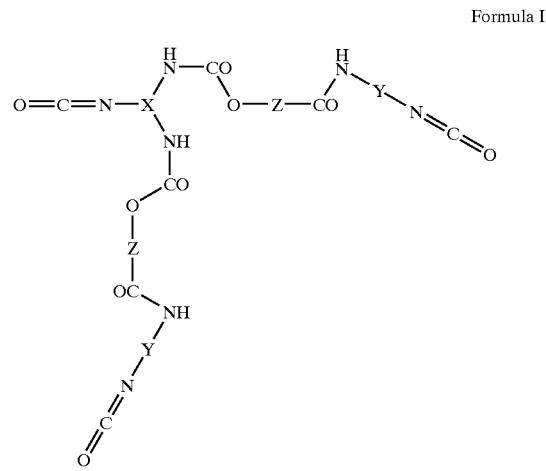

X is a trivalent organic group containing 3–20 carbon atoms;

Y is a divalent organic group containing 3–20 carbon atoms;

Z is an oligomer consisting of monomer units selected from the group consisting of —($CH_2$—$CH_2$—O)—, —($CH_2$—$CH(CH_3)$—O)—, —($CH(CH_3)$—$CH_2$—O)—, —($CH_2$—$CH(CH_2$—$CH_3)$—O)—, —($CH(CH_2$—$CH_3)$—$CH_2$—O)— and —($CH(CH_3)$—$CH(CH_3)$—O)—, and Z has a weight average molecular weight of at most 6000.

in a fifth aspect, the present invention is a prepolymer of formula II:

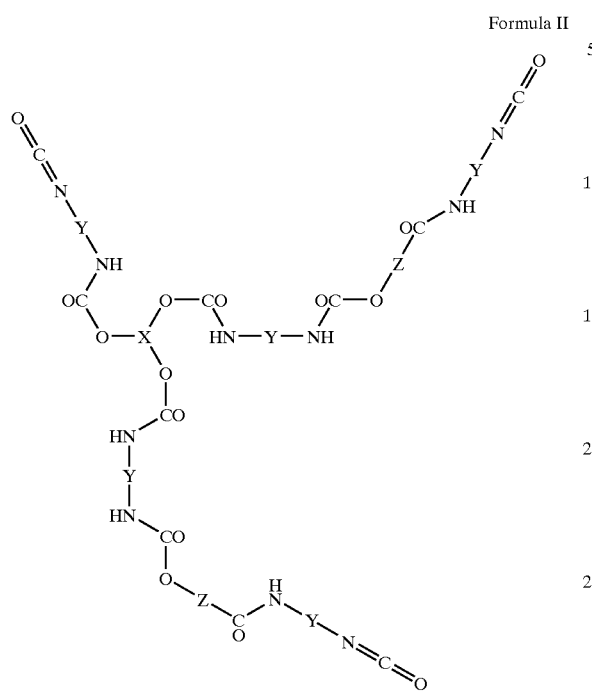

Formula II

X is trivalent organic group containing 3–20 carbon atoms;

Y is a divalent organic group containing 3–20 carbon atoms;

Z is an oligomer consisting of monomer units selected from the group consisting of —($CH_2$—$CH_2$—O)—, —($CH_2$—CH($CH_3$)—O)—, —(CH($CH_3$)—$CH_2$—O)—, —($CH_2$—CH($CH_2$—$CH_3$)—O)—, —(CH($CH_2$—$CH_3$)—$CH_2$—O)— and —(CH($CH_3$)—CH($CH_3$)—O)—, and Z has a weight average molecular weight of at most 6000.

In a sixth aspect, the invention is a mixture, containing (i) water, and (ii) a prepolymer.

In a seventh aspect, the invention is a polyurethane hydrogel, prepared by reacting a prepolymer with an excess of water.

In an eighth aspect, the invention is a polyurethane hydrogel, containing units of formula III

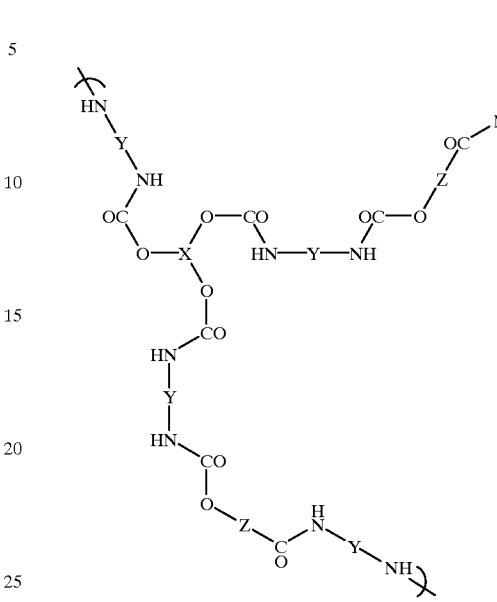

Formula III

X is a trivalent organic group containing 3–20 carbon atoms;

Y is a divalent organic group containing 3–20 carbon atoms;

Z is an oligomer consisting of monomer units selected from the group consisting of —($CH_2$—$CH_2$—O)—, —($CH_2$—CH($CH_3$)—O)—, —(CH($CH_3$)—$CH_2$—O)—, —($CH_2$—CH($CH_2$—$CH_3$)—O)—, —(CH($CH_2$—$CH_3$)—$CH_2$—O)— and —(CH($CH_3$)—CH($CH_3$)—O)—, and Z has a weight average molecular weight of at most 6000.

In a ninth aspect, the invention is a polyurethane hydrogel, containing units of formula VI

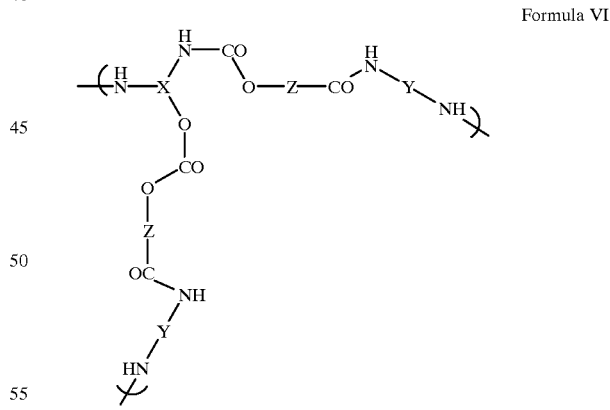

Formula VI

X is a trivalent organic group containing 3–20 carbon atoms;

Y is a divalent organic group containing 3–20 carbon atoms;

Z is an oligomer consisting of monomer units selected from the group consisting of —($CH_2$—$CH_2$—O)—, —($CH_2$—CH($CH_3$)—O)—, —(CH($CH_3$)—$CH_2$—O)—, —($CH_2$—CH($CH_2$—$CH_3$)—O)—, —(CH($CH_2$—$CH_3$)—$CH_2$—O)— and —(CH($CH_3$)—CH($CH_3$)—O)—, and Z has a weight average molecular weight of at most 6000.

In a tenth aspect, the present invention is a contact lens, containing a polyurethane.

In an eleventh aspect, the present invention is a method of forming a contact lens, including injection molding a mixture, to form a contact lens.

In a twelfth aspect, the present invention is a method of forming a contact lens, including injection molding a mixture containing (a) a prepolymer, and (b) water, to form a contact lens. The contact lens contains a polyurethane hydrogel, and is formed in a fully hydrated state.

DETAILED DESCRIPTION

The present invention includes a hydrogel polyurethane prepared by a prepolymer process. In a prepolymer process, at least one polyol and/or polyamine and at least one polyisocyanate (and optionally a catalyst) are reacted first, to produce a prepolymer. The prepolymer is then reacted with at least one chain extender (and optionally a catalyst) to form a polymer. This is in contrast to a one-shot process, where at least one polyol and/or polyamine, at least one polyisocyanate, and at least one chain extender (and optionally a catalyst), are simultaneously mixed together to form a polymer. The properties of a polymer made by a one-shot process are usually different from a polymer made by a prepolymer process, even if the polyols, polyisocyanates and chain extenders are otherwise the same.

The prepolymer is prepared from at least one multifunctional compound, at least one diisocyanate, and at least one diol. The multifunctional compound includes at least 3 functional groups, but may have 4, 5 or even more functional groups. Preferably, the multifunctional compound is a trifunctional compound (3 functional groups). The functional groups are selected from amine, alcohol, or isocyanate groups. Preferably, the multifunctional compound is a triol or triisocyanate. Examples of triols and triisocyanates include glycerol, trimethylol propane, sorbitol, triethanolamine, the isocyanurate trimer of hexamethylene diisocyanate, 2,4,6-toluene triisocyanate, p,p', p"-triphenylmethane triisocyanate, the trifunctional trimer (isocyanurate) of isophorone diisocyanate, and the trifunctional biuret of hexamethylene diisocyanate.

The diisocyanate is preferably an aliphatic diisocyanate. Examples of diisocyanates include methylene dicyclohexyl diisocyanate, hexamethylene diisocyanate, isophorone diisocyanate, toluene-2,4-diisocyanate, toluene-2,6-diisocyanate, mixtures of toluene-2,4 and 2,6-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 3,3"-diphenyl-4,4"-biphenylene diisocyanate, 4,4"-biphenylene diisocyanate, 4,4"-diphenylmethane diisocyanate, 3,3"-dichloro4,4"-biphenylene diisocyanate, 1,6-hexamethylene diisocyanate, 1,4-tetramethylene diisocyanate, 1,10-decamethylene diisocyanate, cumene-2,4-diisocyanate, 1,5-napthalene diisocyanate, 1,4-cyclohexylene diisocyanate, p-tetramethyl xylylene diisocyanate, p-phenylene diisocyanate, 4-methoxy-1,3-phenylene diisocyanate, 4-chloro-1,3-phenylene diisocyanate, 4-bromo-1,3-phenylene diisocyanate, 4-ethoxy-1,3-phenylene diisocyanate, 2,4-dimethyl-1,3-phenylene diisocyanate, 5,6-dimethyl-1,3-phenylene diisocyanate, 2,4-diisocyanatodiphenylether, 4,4'-diisocyanatodiphenylether, benzidine diisocyanate, 4,6-dimethyl-1,3-phenylene diisocyanate, 9,10-anthracene diisocyanate, 4,4'-diisocyanatodibenzyl, 3,3'-dimethyl-4,4'-diisocyanatodiphenylmethane, 2,6-dimethyl-4,4'-diisocyanatodiphenyl, 2,4-diisocyanatostilbene, 3,3'-dimethoxy-4,4'-diisocyanatodiphenyl, 1,4-anthracenediisocyanate, 2,5-fluorenediisocyanate, 1,8-naphthalene diisocyanate, 2,6-diisocyanatobenzfuran, polymeric 4,4'-diphenylmethane diisocyanate, xylylene diisocyanate, and m-tetramethyl xylylene diisocyanate.

The diol is preferably a polyalkylene oxide. The polyalkylene oxide has a weight average molecular weight of at most 7000, preferably 600–6000, more preferably 800–4000, most preferably 1000–2000. Examples include polymers and oligomers of epoxides such as ethylene oxide, propylene oxide, butylene oxide, and their copolymers (i.e. random copolymers of ethylene oxide and propylene oxide, or of ethylene oxide, propylene oxide, and butylene oxide); and copolymers of ethylene glycol and propylene glycol. Preferably the diol is water-soluble.

The prepolymer is prepared by reacting a mixture containing at least one multifunctional compound, at least one diisocyanate, and at least one diol. Other components may optionally be present in the mixture during the reaction, for example a dialkyl tin catalyst, such as dioctyl tin dilaurate, or a solvent, such as an aprotic organic solvent. Since the prepolymer formed will be reactive with water, it is preferable to dry the multifunctional compounds, and the diols prior to forming the mixture. For example, if the triol is trimethylolpropane and the diol is poly(ethylene glycol), these could be dried by first melting them (by heating to about 65° C.) and storing them over molecular sieves, where the trimethylolpropane and the poly(ethylene glycol) are first mixed in the desired ratio for reaction prior to melting.

The prepolymer is preferably an isocyanate terminated prepolymer, and therefore preferably has substantially no unreacted hydroxyl groups; enough of the diisocyanate is used to ensure complete reaction. In the case where the at least one multifunctional compounds include only triols, the mixture for forming the prepolymer contains a ratio of the multifunctional compounds: the diols: the diisocyanates of preferably 0.9–1.1:1.8–2.2:4.5–5.5; more preferably 0.97–1.03:1.94–2.06:4.85–5.15; most preferably 0.99–1.01:1.98–2.02:4.95–5.05; and ideally 1:2:5. In the case when the at least one multifunctional compounds include only trisocyanates, the mixture for forming the prepolymer contains a ratio of the multifunctional compounds: the diols: the diisocyanates of preferably 0.9–1.1:1.8–3.3:1.8–3.3; more preferably 0.97–1.03:1.94–2.06:1.94–2.06; most preferably 0.99–1.01:1.98–2.02:1.98–2.02; and ideally 1:2:2. The mixture is heated at preferably 50–100° C. for preferably 1 hour to 4 days to complete reaction. The reaction is preferably continued until the free isocyanate content has dropped to a value consistent with substantially complete reaction.

The prepolymer preferably has a viscosity of at most 100,000, preferably 1000–50000, centipoises (cps) at 50–70° C. Preferably, the prepolymer has a melting point of at most 70° C., more preferably at most 55° C. The final free isocyanate content of the prepolymer is preferably at most 2.83%, since an amount of free isocyanate greater than this value may result in sufficient $CO_2$ release during polymer formation that bubbles will be trapped in the polymer.

Two embodiments of the prepolymer are illustrated in formulas I and II below:

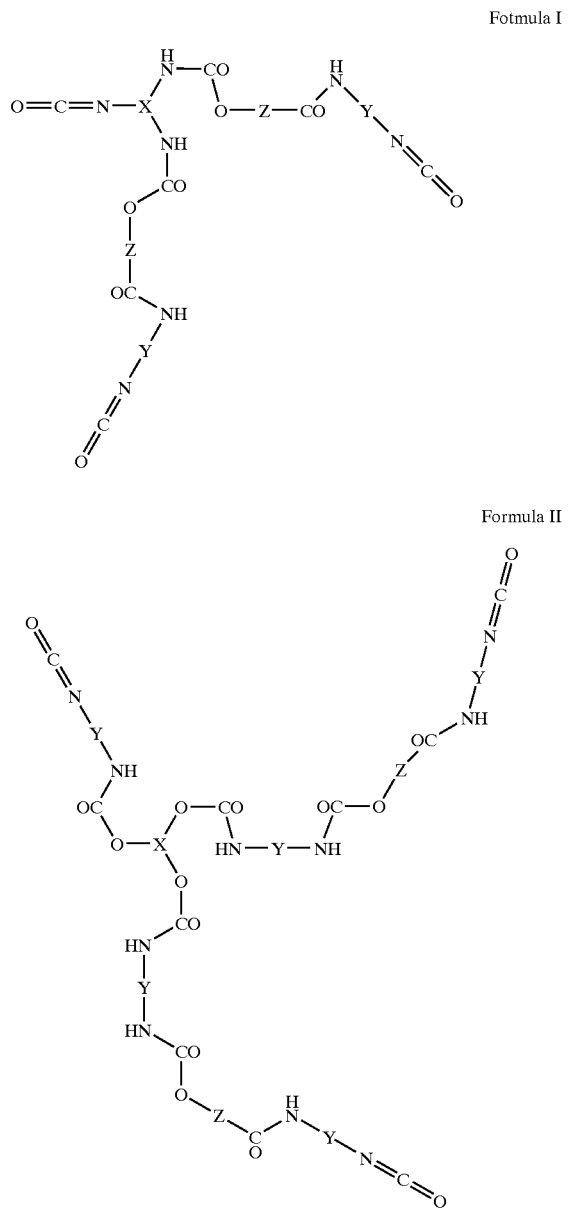

Formula I

Formula II

In formulas I and II, X is a trivalent organic group containing 3–20 carbon atoms (where trivalent mean that it is attached at through three bonds to the remainder of the molecule); Y is a divalent organic group containing 3–20 carbon atoms (where divalent mean that it is attached at through two bonds to the remainder of the molecule); and Z is an oligomer consisting of monomer units selected from the group consisting of —(CH$_2$—CH$_2$—O)—, —CH$_2$—CH(CH$_3$)—O)—, —CH(CH$_3$)—CH$_2$—O)—, —(CH$_2$—CH(CH$_2$—CH$_3$)—O)—, —(CH(CH$_2$—CH$_3$)—CH$_2$—O)— and —(CH(CH$_3$)—CH(CH$_3$)—O)—, and Z has a weight average molecular weight of at most 6000.

Preferably Z has a weight average molecular weight of 600–6000, more preferably 800–4000, most preferably 1000–2000.

Preferably, X is an organic group optionally containing heteroatoms selected from the group consisting of oxygen, nitrogen, sulfur, and halogens, more preferably selected from the group consisting of oxygen and nitrogen. X can be a cyclic or acyclic alkyl group and may be saturated or unsaturated. More preferably, X is a branched saturated acyclic alkyl group, more preferably a branched saturated acyclic alkyl group comprising a quaternary carbon atom, still more preferably, X is CH$_3$CH$_2$—C—CH$_2$—)$_3$. even more preferably, X is a cyclic alkyl group containing 3–20 carbon atoms, even more preferably a cyclic alkyl group containing 3–20 carbon atoms and at least one heteroatom selected from the group consisting of oxygen and nitrogen, still more preferably, X is a 6-membered cyclic alkyl group containing at least one nitrogen, still more preferably, X is a group of formula (V):

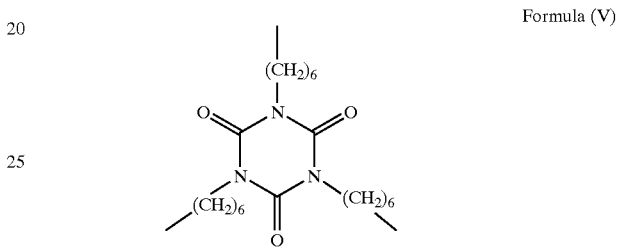

Formula (V)

Y is an organic group containing 3–20 carbon atoms, more preferably an organic group containing at least one cycloalkyl ring, still more preferably an organic group containing at least one cyclohexyl ring. Most preferably, Y is selected from the group consisting of Formulas (VI) and (VII):

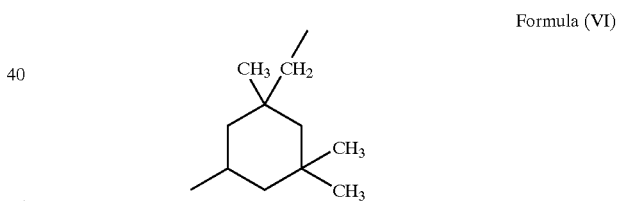

Formula (VI)

and

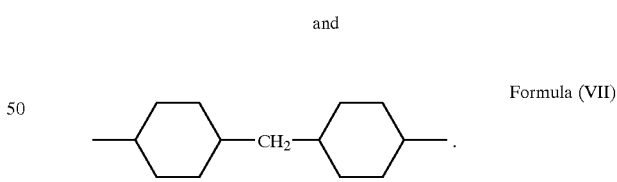

Formula (VII)

Z is an oligomer consisting of monomer units selected from the group consisting of —(CH2—CH2—O)—, —(CH2—CH2—CH2—O)—, —(CH2—CH2—CH2—CH2—O)—, —(CH2—CH2—CH2—CH2—CH2—O)—, —(CH2—CH2—CH2—CH2—CH2—CH2—O)—, —(CH2—CH(CH3)—O)—, —(CH(CH3)—CH2O)—, —(CH2—CH(CH2—CH3)—O)—, —CH(CH2—CH3)—CH2—O)— and —(CH(CH3)—CH(CH3)—O)—, and Z has a weight average molecular weight of at most 7000.

The polymer is formed from the prepolymer by reaction with at least one chain extender. Chain extenders include polyols, polyamines, polyanhydrides, and, preferably, water.

To form the polymer, the prepolymer is preferably formed into a mixture or solution with at least one chain extender, optionally together with at least one solvent, and optionally together with at least one catalyst. The presence of a solvent is less preferred, because it must be removed before the polymer can be used in a contact lens that will come into contact with the eye. This mixture or solution flows easily, and then rapidly gels. Preferably, gelling occures in from 1 minute to 1 day. The chain extender is preferably used in excess, and in the case of water as the chain extender, the weight ratio of water to prepolymer is preferably 0.1:1 to 10:1, and most preferably is an amount of water sufficient to form the polymer in a fully hydrated form.

The solvent is preferably an organic solvent, more preferably an aprotic organic solvent. The more solvent added, the more time necessary to form a gel, and the less viscous the mixture or solution. Prior to forming a gel, the polymer may be molded. The solvent may be removed after formation of the gel or polymer, either by evaporation, or by washing with water. Preferably the viscosity of the mixture or solution is 15 to 500 cps, more preferably 85–115 cps, at 50° C. Examples of solvents include tetrahydrofuran, dioxane, dimethyl formamide, dimethyl sulfoxide, dichloromethane, acetone, butyrolactone, acetonitrile and methyl ethyl ketone, or mixtures thereof. These same solvents may be used during formation of the prepolymer.

The polymer is a hydrogel, and when fully hydrated (i.e. the water content is in equilibrium with a saline solution, typically achieved within 45 minutes for a contact lens-shaped piece of polymer) has a water content of 20–85%, preferably 37–75%, by weight. Preferably the polymer has an oxygen permeablility of at least 10 Barrers at 35° C., more preferably 10 to 100 Barrers at 35° C., for a contact lens-shape piece of polymer. Preferably, the polymer, when fully hydrated, has a contact angle of 0–45°, more preferably 0–15°. Hydrophilicity (contact angle) is determined by measuring the angle formed between the polymer and an air bubble trapped below the polymer, when the polymer is immersed in a saline solution. The angle is measured with a goniometer.

The polymer, when fully hydrated, is preferably optically clear, with a visible light transmission of at least 90%, more preferably at least 95%, most preferably at least 99%. The polymer, when fully hydrated, has a tensile strength of preferably at least 0.03 N/mm². A contact lens formed from the fully hydrated polymer typically has a diameter of 13–15.5 mm, and a thickness of 50–200 μm.

Two embodiments of the polymer include units selected from either unit shown in formulas III and IV below:

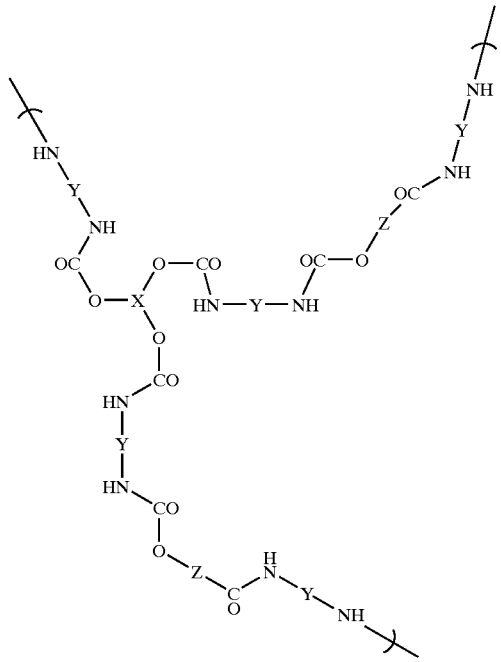

Formula III

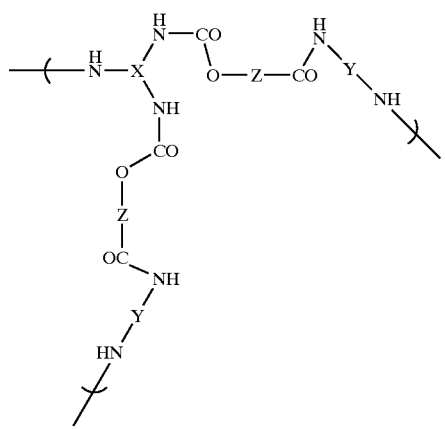

Formula IV where X, Y and Z have the same meaning as described above. The units in the polymer would be attached to each other via C=O groups.

The polymer is preferably molded by cast molding, thermoforming, compression molding, or more preferably injection molding. Most preferably, the injection molding is reactive injection molding. Preferably, no solvent is used and the amount of water present in the mixture or solution is sufficient to fully hydrate the polymer, so that immediately after molding is complete, the polymer is formed in a fully hydrated state, i.e. there is less than a 0.1% change in dimensions between the polymer as formed, and the same polymer in equilibrium with a saline solution.

The injection molding operation is preferably carried out using a circular turntable installation having a plurality of molding stations. The individual molds are clam-shaped. As the turntable rotates, the mixture or solution is injected into each mold, the polymer cures and forms the intended structure, and then the molded object is removed so that the mold may be reused. In the case of forming contact lenses, the present invention allows a fully hydrated lens to be formed directly in the mold, eliminating the need for a hydration step. A circular turntable installation having a plurality of molding stations is well known in the art for forming shoe soles from polyurethanes, and can be adapted to forming other structures, such as contact lenses, by selecting a mold shape corresponding to the final contact lens shape. Examples of these devices for shoe soles are available from KLOCKNER DESMA Schuhmaschinen Gmbh, Achim, Germany, and include The DESMA S764.

EXAMPLES

Example 1

100 g of polyethylene oxide having a molecular weight of 1500 (CARBOWAX 1450) is reacted with 12.86 g of isophorone diisocyanate and 16.16 g of LUXATE™ HT 2000 (isocyanurate trimer of hexamethylene diisocyanate) at 70° C. until the free isocyanate has decreased to the theoretical value of 2.21%. This prepolymer has a viscosity of less than 10000 cps at 50° C. The prepolymer mixes readily with water at that temperature. It is then mixed with the appropriate amount of water in a LIQUID CONTROLS CORPORATION POSI-DOT™ dispenser/mixer, and the appropriate amount of the mixture is delivered into a contact lens mold. The mixture cured into a hydrated polymer in the shape of a contact lens, having a water content of 74%.

Example 2

A mixture of 58.045 grams of polyethylene oxide with a molecular weight of 1500 (CARBOWAX 1450), 11.187 grams of polyethylene oxide with a molecular weight of 8000 (CARBOWAX 8000), and 2.971 gm trimethylolpropane, was dried over 3 Å molecular sieves for one week. A nitrogen-purged, stirred reactor was assembled with 71.131 gm of this formulation together with 33.056 gm 4,4'-methylenebis(cyclohexyl isocyanate). The reaction was performed in a thermostatted bath at 55° C. After 260 minutes, the reaction had become viscous. At this time, 61.316 gm acetonitrile was added. After 22 hours total reaction time, an additional 43.255 gm acetonitrile was added. The reaction was then removed from the heating bath.

Approximately 3.6% wt distilled water was stirred into portions of this prepolymer solution. The mixture was dispensed into polypropylene casting cups; 300 cups were filled using four batches of material. The filled cups were allowed to cure overnight at room temperature, then opened. The resulting cross-linked material was removed from the casting cup, placed in saline solution, and allowed to hydrate overnight. The lenses were transferred to vials with packaging solution and sterilized in an autoclave at 121° C. for 1 hour. This produced a contact lens with a water content (as measured according to STM #358) of 71%, having acceptable clarity.

Example 3

100 grams of Carbowax 1450, (polyethylene oxide having a molecular weight of about 1500) and 4.47 grams of trimethylol propane were melted together and mixed with 43.7 grams of methylene dicyclohexyl diisocyanate. This mixture was heated for about 100 hours at 79° C., during which time the measured free isocyanate content decreased from a starting value of 9.46% to 2.84%, which is the theoretical content for the prepolymer in which all hydroxyl groups have reacted with isocyanate. This prepolymer was mixed with water, and reacted during a period of about 5 minutes to form a hydrogel polymer having an equilibrium water content of about 70%. The mixture was poured into a mold to form a contact lens.

Example 4

To 23.287 g UCON 75-H-1400, a random copolymer of 75% ethylene glycol and 25% propylene glycol having a molecular weight of 2500 g/mol, was added 4.046 g Luxate HT 2000 (isocyanurate trimer of hexamethylene diisocyanate) and 3.007 g isophorone diisocyanate. The mixture was heated at 70° C. fo 144 h, at which time the free isocyanate concentration had dropped below the theoretical value of 4.13%. This prepolymer was mixed with water, applied to contact lens molds and allowed to cure yielding contact lenses with a water content of 70%.

Example 5

All of the following samples represent typical Carbowax formulations. Reactants are mixed and heated in a sealed vessel at 70° C. All units are by weight in grams.

TABLE 3

| | Example # | | | | | | | | |
|---|---|---|---|---|---|---|---|---|---|
| Ingredient | 1 | 2 | 3 | 4 | 5 | 6 | 7 | 8 | 9 |
| CW-600 | 100 | | | | | | | | |
| CW-1000 | | 100 | | | | | | | |
| CW-1450 | | | 100 | 100 | 100 | 100 | | | 100 |
| CW-4000 | | | | | | | 100 | | |
| CW-8000 | | | | | | | | 90 | |
| TMP | | | | | | | 3.3 | | 4.47 |
| TPEG | 55.5 | 56 | 55.5 | 56 | | | | | |
| DesW | 87.3 | 87.3 | | 69.8 | | 15.18 | | | 43.7 |
| IPDI | | | 59.2 | | 12.36 | | | | |
| HT2000 | | | | | 16.16 | 8.08 | | | |
| TMXDI | | | | | | | 30.5 | 5.13 | |
| React. Time Hours | 72 | 120 | 96 | 72 | 144 | 120 | 192 | 24 | 72 |
| Lens Made | | | | | yes | | | | yes |

In Table 3, CW refers to Carbowax, TMP refers to trymethyol propane, TPEG refers to trifunctional polyethylene glycol (polyethylene glycol triol), DesW refers to methylene dicyclohexyl diisocyanate, IPDI referes to isophorone diisocyanate, HT2000 refers to isocyanurate trimer of hexamethylene diisocyanate, and TMXDI refers to tetramethyl xylyl diisocyanate.

Example 6

A study was performed to test the lenses produced in Example 2.

TABLE 4

Overview of Study

| | |
|---|---|
| Study Type: | Non-dispensed, internal, single-masked, unilateral. |
| Final Subject base: | 10 subjects; 10 eyes. |
| Study Lens: | Polyurethane, 75% Water, Meas. 8.61 mm B.C., Meas. 14.7 mm Diameter, Meas. 0.102 mm C.T., Meas. 0.151 mm Mid-Carrier Thickness, Pwr: −2.72 (See Table 5) |
| Method: | Each subject wore one test lens on one eye for a minimum of 15 minutes and a maximum of 60 minutes. Clinical and subjective measures were recorded immediately after insertion and every 15 minutes for the first hour. |
| Key Performance Measures: | Lens Movement, Push-Up Test, Lens Position, Lens Lag, Pre-Lens Tear Film (PLTF), Handling Rating, and Comfort Rating. |

Subjective Lens Handling

The median handling rating of the test lens is 9.0 (on a 10-point scale), excellent-acceptable, "lens maintains concave shape on index finger, does not stick together, no problems with lens insertion and/or removal." (See Table 6) Nine of the subjects rated lens handling as "8, 9, or 10," and the remaining subject assessed lens handling as "6." Based on overall lens handling, 100% of the study lenses were acceptable. (See Table 8)

Subjective Lens Comfort

Immediately after lens insertion, the median comfort rating of the test lens is 9.0 (on a 10-point scale), excellent-perfect comfort, no lens awareness, "I can't feel this lens even when I think about it." At 15, 30, 45, and 60 minutes of wear, the median comfort rating of the test lens is 9.0. (See Table 6) Based on overall comfort, 100% of the study lenses were acceptable. (See Table 8)

One subject rated lens comfort as "8," acceptable, immediately after lens insertion and at 15 minutes of wear, however, at 30 minutes of wear the rating decreased to "3," unacceptable. The subject complained of an "itchy" sensation; this was contributed to a current mild seasonal allergy condition. The lens was removed and the subject was discontinued from the clinical evaluation.

Lens Fitting Performance

The median lens movement is 0.25 mm in primary gaze and 0.37 mm in upward gaze, acceptable, immediately after lens insertion. The median lens movement is 0.25 mm in primary and upward gaze, acceptable, at 15, 30, 45, and 60 minutes of wear. (See Table 6)

The push-up test is performed to assess lens tightness. Immediately after lens insertion, the median push-up score is 2.0 [on a 5-point (0–4) scale], excellent freedom of movement, between 0.25–0.50 mm. At 15 minutes of wear, the median push-up score is 1.50, acceptable. At 30, 45, and 60 minutes of wear, the median push-up score is 2.0, acceptable. (See Table 6)

The median centration rating for the test lens is 5.0, centered, 0 mm lens displacement, immediately after lens insertion and at 15, 30, 45, and 60 minutes of wear. (See Table 6)

The median lens lag observed for the test lens is 1.0, optimal lens lag, minimum lens displacement relative to the cornea during lateral and upward eye movements, immediately after lens insertion and at 15, 30, 45, and 60 minutes of wear. (See Table 6)

Front Lens Surface Wettability

The median pre-lens tear film (PLTF) quality rating was 0, tear film regular and smooth for all of the lens surface, no debris adherent to the lens front surface, immediately after lens insertion and at 15, 30, 45, and 60 minutes of wear. (See Table 6)

Pre-Fit and Post-Fit Slit Lamp Exam (SLEX)

Pre-fit SLEX: the cornea and palpebral conjunctiva tissues were unremarkable for all 10 subjects. Trace (grade 1) overall bulbar conjunctiva injection was evident on the test eye for two subjects; within-normal limits. The bulbar conjunctiva was normal for the remaining eight subjects. (See Table 7)

Post-fit SLEX: after 60 minutes of lens wear, trace superficial micropunctate staining was present from 5–7 o'clock on the corneal tissue on the right eye for one subject. The subject's cornea was re-evaluated 3 hours later and the tissue fully recovered. Trace (grade 1) overall bulbar conjunctiva injection was still evident on the test eye for two subjects; with-in-normal limits. (See Table 7)

From this non-dispensed study, we found that the spherical soft lens performance clinically acceptable with respect to all key performance measures during the duration of the trial period. In terms of lens insertion and removal, the entire subject sample judged the handling of the study lenses to be acceptable. Nine out of the ten participants judged lens comfort as excellent/perfectly comfortable after sixty minutes of wear. However, after thirty minutes of wear, one subject rated the comfort of the lenses as fair/slightly comfortable, slightly uncomfortable, lens awareness, which is clinically unacceptable. The subject's response was secondary to a mild seasonal allergic condition.

With regard to overall fitting performance, the majority of lenses moved optimally, 0.25 mm to 0.37 mm in straight-ahead and superior gaze. The lenses exhibited excellent freedom of movement during the push-up procedure. With respect to lens centration, 100% displayed acceptable lens placement relative to the corneal limbus. Concerning lens lag, all lenses displayed an acceptable fit/optimal lag. Minimum lens displacement was observed and the lens followed the cornea during lateral and vertical eye excursions. A full and stable tear film was observed on the front surface for all test lenses.

TABLE 5

| Lens Parameter | Statistic | Polyurethane |
|---|---|---|
| Base Curve | Median | 8.61 |
| | Mean | 8.62 |
| | Std Dev | 0.03 |
| | n = Lenses | 8 |
| Overall Diameter | Median | 14.7 |
| | Mean | 14.75 |
| | Std Dev | 0.02 |
| | n = Lenses | 10 |

TABLE 5-continued

| Lens Parameter | Statistic | Polyurethane |
|---|---|---|
| Power | Median | −2.72 |
|  | Mean | −2.76 |
|  | Std Dev | 0.06 |
|  | n = Lenses | 10 |
| Center Thickness | Median | 0.102 |
|  | Mean | 0.103 |
|  | Std Dev | 0.003 |
|  | n = Lenses | 10 |
| Mid-Carrier Thickness (cross-section) | Mean | 0.151 |
|  | Std Dev | 0.002 |
|  | n = Lenses | 6 |

TABLE 6

Summary Statistics

| Measure | Statistic | 0 Minutes | 15 Minutes | 30 Minutes | 45 Minutes | 60 Minutes |
|---|---|---|---|---|---|---|
| Comfort Rating (10-point subjective scale) | Median | 9.00 | 9.00 | 9.00 | 9.00 | 9.00 |
|  | Mean | 8.70 | 8.70 | 8.20 | 8.78 | 8.89 |
|  | Std Dev | 1.16 | 1.16 | 2.04 | 0.97 | 0.78 |
|  | n | 10 | 10 | 10 | 9 | 9 |
|  | NR | 0 | 0 | 0 | 1 | 1 |
| Handling Rating (10-point subjective scale) | Median | 9.00 | NA | NA | NA | NA |
|  | Mean | 8.50 | NA | NA | NA | NA |
|  | Std Dev | 1.08 | NA | NA | NA | NA |
|  | n | 10 | NA | NA | NA | NA |
|  | NR | 0 | NA | NA | NA | NA |
| Movement Primary Gaze (mm) | Median | 0.25 | 0.25 | 0.25 | 0.25 | 0.25 |
|  | Mean | 0.30 | 0.26 | 0.26 | 0.25 | 0.25 |
|  | Std Dev | 0.14 | 0.11 | 0.11 | 0.11 | 0.13 |
|  | n | 10 | 10 | 10 | 9 | 9 |
|  | NR | 0 | 0 | 0 | 1 | 1 |
| Movement Upward Gaze (mm) | Median | 0.37 | 0.25 | 0.25 | 0.25 | 0.25 |
|  | Mean | 0.36 | 0.31 | 0.31 | 0.29 | 0.28 |
|  | Std Dev | 0.09 | 0.12 | 0.09 | 0.11 | 0.10 |
|  | n | 10 | 10 | 10 | 9 | 9 |
|  | NR | 0 | 0 | 0 | 1 | 1 |
| Push-Up (5-point (0–4) scale) | Median | 2.00 | 1.50 | 2.00 | 2.00 | 2.00 |
|  | Mean | 1.70 | 1.60 | 1.60 | 1.56 | 1.44 |
|  | Std Dev | 0.82 | 0.70 | 0.70 | 0.73 | 0.73 |
|  | n | 10 | 10 | 10 | 9 | 9 |
|  | NR | 0 | 0 | 0 | 1 | 1 |
| Lens Centration (5-point (0–4) scale) | Median | 5.00 | 5.00 | 5.00 | 5.00 | 5.00 |
|  | Mean | 4.70 | 4.80 | 4.80 | 4.78 | 4.78 |
|  | Std Dev | 0.48 | 0.42 | 0.42 | 0.44 | 0.44 |
|  | n | 10 | 10 | 10 | 9 | 9 |
|  | NR | 0 | 0 | 0 | 1 | 1 |
| Lens Lag (5-point (0–4) scale) | Median | 1.00 | 1.00 | 1.00 | 1.00 | 1.00 |
|  | Mean | 1.00 | 1.00 | 1.00 | 1.00 | 0.89 |
|  | Std Dev | 0.00 | 0.00 | 0.00 | 0.00 | 0.33 |
|  | n | 10 | 10 | 10 | 9 | 9 |
|  | NR | 0 | 0 | 0 | 1 | 1 |
| Pre-lens Tear Film (5-point (0–4) scale) | Median | 0.00 | 0.00 | 0.00 | 0.00 | 0.00 |
|  | Mean | 0.10 | 0.20 | 0.10 | 0.11 | 0.11 |
|  | Std Dev | 0.32 | 0.42 | 0.32 | 0.33 | 0.33 |
|  | n | 10 | 10 | 10 | 9 | 9 |
|  | NR | 0 | 0 | 0 | 1 | 1 |

TABLE 7

Slit Lamp Examination Results (% of Eyes)

| Slit Lamp Finding | Severity | Pre-Fit | Post-Fit |
|---|---|---|---|
| Edema | None | 100.0% | 100.0% |
|  | Trace | 0.0% | 0.0% |
|  | Mild | 0.0% | 0.0% |
|  | Moderate | 0.0% | 0.0% |
|  | Severe | 0.0% | 0.0% |
| Corneal Neovascularization | None | 100.0% | 100.0% |
|  | Trace | 0.0% | 0.0% |
|  | Mild | 0.0% | 0.0% |
|  | Moderate | 0.0% | 0.0% |
|  | Severe | 0.0% | 0.0% |
| Corneal Staining | None | 100.0% | 90.0% |
|  | Trace | 0.0% | 10.0% |
|  | Mild | 0.0% | 0.0% |
|  | Moderate | 0.0% | 0.0% |
|  | Severe | 0.0% | 0.0% |
| Injection | None | 80.0% | 80.0% |
|  | Trace | 20.0% | 20.0% |
|  | Mild | 0.0% | 0.0% |
|  | Moderate | 0.0% | 0.0% |
|  | Severe | 0.0% | 0.0% |
| Tarsal Abnormalities | None | 100.0% | 100.0% |
|  | Trace | 0.0% | 0.0% |
|  | Mild | 0.0% | 0.0% |
|  | Moderate | 0.0% | 0.0% |
|  | Severe | 0.0% | 0.0% |

TABLE 8

Acceptability of Lens Comfort and Handling (Lenses found to be acceptable)

| Measure | Statistic | 0 Minutes | 15 Minutes | 30 Minutes | 45 Minutes | 60 Minutes |
|---|---|---|---|---|---|---|
| Comfort Acceptable | % of Lenses | 100.0% | 100.0% | 90.0% | 100.0% | 100.0% |
|  | # of Lenses | 10 | 10 | 9 | 9 | 9 |
|  | n | 10 | 10 | 10 | 9 | 9 |
|  | NR | 0 | 0 | 0 | 1 | 1 |
| Handling Acceptable | % of Lenses | 100.0% |  |  |  |  |
|  | # of Lenses | 10 | NA | NA | NA | NA |
|  | n | 10 |  |  |  |  |

Obviously, numerous modifications and variations of the present invention are possible in light of the above teachings. It is therefore to be understood that within the scope of the appended claims, the invention may be practiced otherwise than as specifically described herein.

What is claimed is:

1. A prepolymer, which is an isocyanate terminated prepolymer, is free of unreacted hydroxyl groups and is prepared by reacting a mixture comprising:

(a) at least one multifunctional compound containing three or more amine or isocyanate groups, (b) at least one diisocyanate, and (c) at least one diol,
wherein said diol has a weight average molecular weight of at most 7000,
said prepolymer has a viscosity of at most 100,000 cps at 70° C., and
said prepolymer, when reacted with an excess of water, forms a hydrogel polymer.

2. The prepolymer of claim 1, wherein component (a) is at least one triisocyanate compound selected from the group consisting of the isocyanurate trimer of hexamethylene diisocyanate, 2,4,6-toluene triisocyanate, p,p',p"-triphenylmethane triisocyanate, the isocyanurate of isophorone diisocyanate, and the trifunctional biuret of hexamethylene diisocyanate.

3. A prepolymer, prepared by reacting a mixture comprising:
(a) at least one triisocyanate,
(b) at least one diisocyanate, and
(c) at least one polyalkylene oxide having two terminal hydroxyl groups,
wherein a molar ratio of (a):(b):(c) in said mixture is 0.9–1.1:1.8–3.3:1.8–3.3,
said at least one polyalkylene oxide has weight average molecular weight of at most 7000, and
said prepolymer, when reacted with an excess water, forms a hydrogel polymer.

4. The prepolymer of claim 3, wherein said molar ratio of (a):(b):(c) in said mixture is 0.97–1.03:1.94–2.06:1.94–2.06, and
said at least one polyalkylene oxide has a weight average molecular weight of 1000–2000.

5. The prepolymer of claim 4, wherein said prepolymer has a viscosity of 1000 to 50,000 cps at 70° C.

6. The prepolymer of claim 3, wherein the triisocyanate is the isocyanurate trimer of hexamethylene diisocyanate, 2,4,6-toluene triisocyanate, p,p',p"-triphenylmethane triisocyanate, the isocyanurate of isophorone diisocyanate, or the trifunctional biuret of hexamethylene diisocyanate.

7. The prepolymer of claim 3, wherein the diisocyanate is methylen dicyclohexyl diisocyanate, hexamethylene diisocyanate, isophrone diisocyanate, toluene-2,4-diisocyanate, toluene-2,6-diisocyanate, ethylene diisocyanate, ethylidene diisocyanate, propylene-1,2-diisocyanate, cyclohexylene-1,2-diisocyanate, ethylene diisocyanate, ethylidene diisocyanate, propylene-1,2-diisocyanate, cyclohexylene-1,4-diisocyanate, m-phenylene diisocyanate, 3,3"-diphenyl-4,4"-biphenylene diisocyanate, 4,4"-biphenylene diisocyanate, 4,4"-diphenylmethane diisocyanate, 3,3"-dichloro-4,4"-biphenylene diisocyanate, 1,6-hexamethylene diisocyante, 1,4-tetramethylene diisocyante, 1,10-decamethylene diisocyanate, cumene-2,4-diisocyanate, 1,5-naphthalene diisocyante, 1,4-cyclohexylene diisocyanate, p-tetramethyl xylylene diisocyanate, p-phenylene diisocyante, 4-methoxy-1,3-phenylene diisocyante, 4-chloro-1,3-phenylene diisocyanate, 4-bromo-1,3-phenylene diisocyanate, 4-ethoxy-1,3-phenylene diisocyanate, 2,4-dimethyl-1,3-phenylene diisocyanate, 5,6-dimethyl-1,3-phenylene diisocyanate, 2,4-diisocyanatodiphenylether, 4,4"-diisocyanatodiphenylether, benzidine diisocyanate, 4,6-dimethyl-1,3-phenylene diisocyanate, 9,10-anthracene diisocyanate, 4,4'-diisocyanatodibenzyl, 3,3'-dimethyl-4,4'-diisocyanatodiphenylmethane, 2,6-dimethyl-4,4'-diisocyanatodiphenyl, 2,4-diisocyanatostilbene, 3,3'-dimethoxy-4,4'-diisocyanatodiphenyl, 1,4-anthracenediisocyanate, 2,5-fluorenediisocyanate, 1,8-naphthalene diisocyanate, 2,6-diisocyanatobenzfuran, xylylen diisocyanate, or m-tetramethyl xylylene diisocyanate.

8. A prepolymer, which is an isocyanate terminated prepolymer, is free of unreacted hydroxyl groups and is prepared by reacting a mixture comprising:
(a) at least one triol,
(b) at least one diisocyanate, and
(c) at least one polyalkylene oxide having two terminal hydroxyl groups,
wherein a molar ratio of (a):(b):(c) in said mixture is 0.9–1.1:4.5–5.5:1.8–2.2,
said at least one polyalkylene oxide has a weight average molecular weight of at most 7000, and
said prepolymer, when reacted with an excess water, forms a hydrogel polymer.

9. The prepolymer of claim 8, wherein said molar ratio of (a):(b):(c) in said mixture is 0.97–1.03:4.85–5.15:1.94–2.06, and said at least one polyalkylene oxide has a weight average molecular weight of 1000–2000.

10. The prepolymer of claim 9, wherein said prepolymer has a viscosity of 1000 to 50,000 cps at 70° C.

11. The prepolymer of claim 8, wherein the triol is glycerol, trimethylol propane, or triethanolamine.

12. A prepolymer of formula I:

Formula I

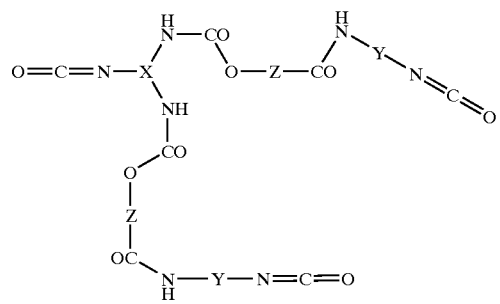

wherein X is a trivalent organic group containing 3–20 carbon atoms;

Y is a divalent organic group containing 3–20 carbon atoms;

Z is an oligomer consisting of monomer units selected from the group consisting of —(CH$_2$—CH$_2$—O)—, —(CH$_2$—CH(CH$_3$)—O)—, —(CH(CH$_3$)—CH$_2$—O)—, —(CH$_2$—CH(CH$_2$—CH$_3$)—O)—, —(CH(CH$_2$—CH$_3$)—CH$_2$—O)—, and —(CH(CH$_3$)—CH(CH$_3$)—O)—, and Z has a weight average molecular weight of at most 7000.

13. The prepolymer of claim 12, wherein
Y is a divalent aliphatic group,
Z has a weight average molecular weight of 1000–2000, and
Said prepolymer has a viscosity of 1000 to 50,000 cps at 70° C.

14. The prepolymer of claim 12, wherein the trivalent organic group X contains heteroatoms selected from the group consisting of oxygen, nitrogen, sulfur, and halogens.

15. The prepolymer of claim 14, wherein X is a saturated or unsaturated cyclic group or a saturated or unsaturated acyclic alkyl group.

16. The prepolymer of claim 15, wherein X is a 6-membered cyclic group containing at least one nitrogen.

17. The prepolymer of claim 16, wherein X is a group of formula (V)

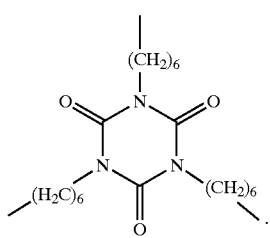
(V)

18. The prepolymer of claim 12, wherein Y is a group of Formula (VI) or (VII)

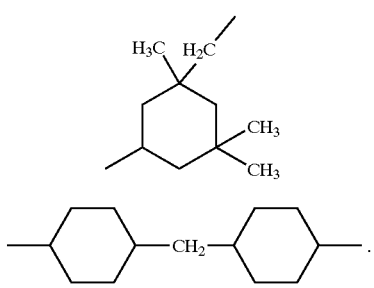
(VI)

(VII)

19. A prepolymer of formula II:

Formula II

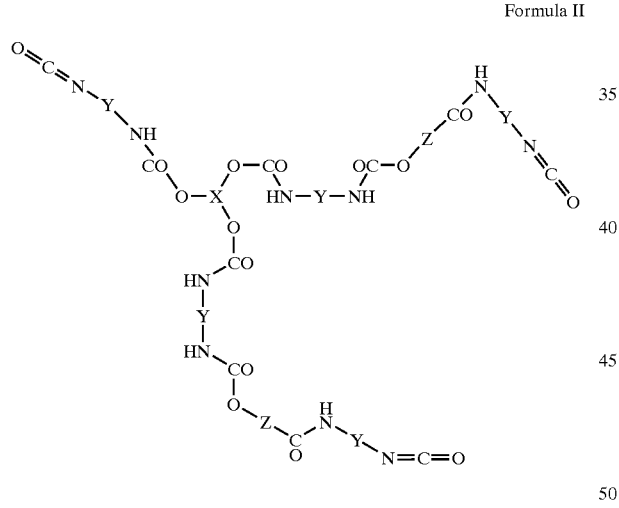

wherein X is trivalent organic group containing 3–20 carbon atoms;
Y is divalent organic group containing 3–20 carbon atoms;

Z is an oligomer consisting of monomer units selected from the group consisting of —(CH$_2$—CH$_2$—O)—, —(CH$_2$—CH(CH$_3$)—O)—, —(CH(CH$_3$)—CH$_2$—O)—, —(CH$_2$—CH(CH$_2$—CH$_3$)—O)—, —(CH(CH$_2$—CH$_3$)—CH$_2$—O)—, and —(CH(CH$_3$)—CH(CH$_3$)—O)—, and Z has a weight average molecular weight of at most 7000.

20. The prepolymer of claim 1, wherein
Y is a divalent aliphatic group,
Z has a weight average molecular weight of 1000–2000, and
Said prepolymer has a viscosity of 1000 to 50,000 cps at 70° C.

21. The prepolymer of claim 19, wherein the trivalent organic group X contains heteroatoms selected from the group consisting of oxygen, nitrogen, sulfur, and halogens.

22. The prepolymer of claim 21, wherein X is a saturated or unsaturated cyclic group or a saturated or unsaturated acyclic alkyl group.

23. The prepolymer of claim 22, wherein X is a 6-membered cyclic group containing at least one nitrogen.

24. The prepolymer of claim 23, wherein X is a group of formula (V)

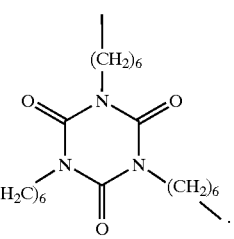
(V)

25. The prepolymer of claim 19, wherein Y is a group of Formula (VI) or (VII)

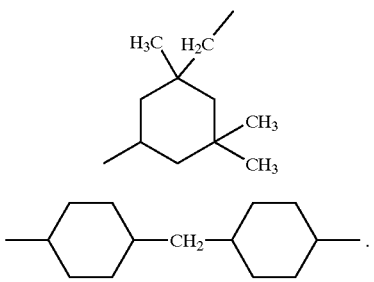
(VI)

(VII)

* * * * *